(12) United States Patent
Vertes et al.

(10) Patent No.: US 7,921,319 B2
(45) Date of Patent: Apr. 5, 2011

(54) METHOD AND SYSTEM FOR PROVIDING A DETERMINISTIC VIRTUAL CLOCK

(75) Inventors: Marc Philippe Vertes, Saint-Lys (FR); Philippe Bergheaud, Colmar (FR)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 11/861,363

(22) Filed: Sep. 26, 2007

(65) Prior Publication Data

US 2008/0155299 A1   Jun. 26, 2008

(30) Foreign Application Priority Data

Dec. 20, 2006   (EP) ..................................... 06301273

(51) Int. Cl.
*G06F 1/00* (2006.01)
(52) U.S. Cl. ............. 713/500; 713/400; 713/600; 718/1
(58) Field of Classification Search .................. 713/400, 713/500, 600; 718/1
See application file for complete search history.

(56) References Cited

U.S. PATENT DOCUMENTS

| 7,334,014 B2 * | 2/2008 | Moser et al. ................... 709/202 |
| 7,756,697 B2 * | 7/2010 | Nakamura ..................... 703/23 |
| 2004/0205372 A1 * | 10/2004 | Moser et al. ..................... 714/1 |
| 2006/0259818 A1 * | 11/2006 | Howell et al. .................. 714/21 |
| 2007/0010988 A1 * | 1/2007 | Nakamura ..................... 703/26 |

FOREIGN PATENT DOCUMENTS

FR   2881244   7/2006

* cited by examiner

*Primary Examiner* — Thomas Lee
*Assistant Examiner* — Jaweed A Abbaszadeh
(74) *Attorney, Agent, or Firm* — Yee & Associates, P.C.; David A. Mims, Jr.

(57) ABSTRACT

A method and system for providing a virtual clock on a computer by multiplying the number of instructions executed by the average instruction execution time. It is however not reliable to use this generic computation for virtualization of application in a fault tolerant system because the virtual clock computed like this quickly deviates from the system clock. A virtual clock computation is provided which includes periodic readjustment of the virtual to the system clock. Also, the errors coming from rounding of the number of executing instruction are suppressed.
Taking the assumption that the user instruction counters are maintained synchronized in the operational and the replication computers, replacing the system clock access by a virtual clock when virtualizing applications thus turning the system clock acquisition into a deterministic event. Replicating the system clock access can be thus done by re-executing the application code in the replication machine avoiding transfer of information at each system clock access of the virtualized application programs.

18 Claims, 7 Drawing Sheets

METHOD AND SYSTEM FOR PROVIDING A DETERMINISTIC VIRTUAL CLOCK

FIELD OF THE INVENTION

The present invention generally relates to clock virtualization for replication of applications or operating systems executing on a computer; more particularly, the present invention provides a deterministic virtual clock allowing an efficient replication of clock access requests which are non deterministic.

BACKGROUND OF THE INVENTION

Replication on one replication machine of programs executing on an operational machine includes record and replay of events that produce non deterministic results. For events producing non deterministic results which are recorded on the operational machine the event information is transferred from the operational machine to the other machine for replay. The impact is overhead on the machines and communication cost for transfer of event information. Events producing deterministic results during a program execution are not recorded as they can be reproduced by simple checkpointing and re-execution of the program on the replication machine after restoring the checkpointed environment.

During the execution of a program, when the system clock is accessed, it typically produces a non deterministic event which is recorded in the operational machine, transferred from the operational machine to the replication machine and replayed in the replication machine using the event information. This standard solution could be acceptable when replication of programs is performed for debugging of these programs. In this case the operational machine for application recording and the replication machine for application replay may be the same machines, the replay being definitely a 'later replay'. This standard solution may be also acceptable when replication is done for legal archiving purpose. For fault tolerant system, wherein executing programs need to be restored on a backup machine in case of failure of the operational machine, this standard solution is not acceptable as the fault tolerant system needs an immediate switch from the operational machine to a backup machine in case of failure. The backup machine is maintained active, the operational machine performs records of event data and periodic transfer of these data to the backup machine. The backup machine uses each event data transfer at each transfer to replicate the program execution.

In the rest of the document replication of executing programs may designate replication per application or per operating system depending on the type of virtualization technology.

If the application to be replicated implements communication protocols or transactional applications such as server applications, it implements intensive accesses to the clock, may be up to several thousands accesses to the clock per second, which leads to an important slow down of the replication process. This is a strong problem when replication is used in a fault tolerant system, wherein an application runs on a operational machine and its execution is immediately and entirely replicated on a second machine in order to immediate recover, in case of primary machine failure.

Hardware based solutions are the most reliable solutions for fault tolerant systems with on the fly recovery and they are successful today. A so called 'lockstep mode' of replication consists in replicating instruction by instruction execution on two synchronous CPUs on one unique clock. It allows a single physical clock to drive several processors, by extending the bus between 2 motherboards and forwarding the clock signal. It implies a clock transfer at 10 MHz rate on an optical fiber the operational and backup computer systems being tightly coupled. This mode does not allow the computer systems to be really distributed. It also requires homogeneous replica systems (same processors running at the same speed). The Integrity NonStop Servers which have Itanium based processors of Hewlett-Packard use additional redundant CPUs running the same instruction stream. When a fault is detected (e.g. by lockstep mismatch), the failing module is disabled while the redundant module continues processing the instruction stream without interruption. The Stratus© ftServers© of Stratus Technologies are similar. This hardware based fault tolerant systems have some physical constraints such as that the operational and backup systems must be in the same building. Furthermore, the hardware solution implies replicating the entire physical system and does not provide the granularity of virtualization by application as done with software implementable solutions.

In order to avoid the hardware limitations, it seems preferable to come back to a software implementable solution. It is needed to find a way to replicate virtualized application in a fault tolerant way while avoiding record, transfer and replication of each system clock access request in the virtualized application because it is too costly.

The patent application WO2006/079623 'Method for counting instructions for logging and replay of a deterministic sequence of events' assigned to International Business Machines Corporation, deals with a 'record and replay' virtualization of applications which is a pure software implementable virtualization solution. For fault tolerance purpose a backup machine needs to be always maintained in the same status than the operational machine. The application code executing on the operational machine can be replayed by reexecuting the application code in the backup machine. However, this is theoretical because the events (interruption signal, system calls etc. . . . ) occurring during code execution cannot be 'reexecuted' on the replication machine. The occurrence of an event needs immediate recording, transfer to the backup machine of the event data and replay of the event on the backup machine. To avoid this costly record transfer and replay steps at each occurrence of a deterministic event which can be identified by its point in the instruction execution flow, the patent application suggests identifying the event occurrence by the number of instructions already executed by the application code. In this way, during the reexecution of the application code in the backup machine, the occurrence of each event can be reproduced by counting the number of instructions already executed in the application code. In the replication machine, an overflow of the user instruction count (provided by the processor as described hereunder) is initialized beforehand in order to determine a number of instructions having to be executed from the start of the replay period and the overflow of which causes an interruption of the replay task. It is sufficient to maintain in each machine a synchronized counter of user instructions executed in the code. To this effect, the performance monitor unit provides the user instruction count (uic) that is the number of instructions executed in the user space without counting the instructions executed in the kernel space. The cited patent application proposes a way of counting exactly the uic for each task in the operational machine and to maintain synchronization of the uic in the backup machine. This implies an exact replication of the application in the backup machine by simple reexecution of the application code including the deterministic events for which the exact point of execution is pointed out by the uic value. More precisely, the uic is maintained in synchronization in the PMC of the operational and the replication machines. The uic is reset to zero at each occurrence of an event, thus avoiding uic counter overflows. Thus, to replay the virtualized application, the backup machine reexecutes the code of the application, including deterministic events, until the occurrence of a non deterministic event. A non deterministic event are replayed from the log.

System clock accesses are non deterministic events because the values returned by the system clock are different each time the system is accessed. Thus, the solution of the cited patent application does not allow replication of non deterministic events such as system clock access requests by simple reexecution of the application code in the backup machine that is without replaying the event from the log.

There is thus still a need for providing a solution for replicating accesses to system clock in a way usable for fault tolerant system configurations.

SUMMARY OF THE INVENTION

The object of the present invention is to provide a solution for replicating clock access requests in an efficient and reliable way in order to allow its use in fault tolerant system configurations.

This object is reached with a method for providing a virtual clock on an operational computer having one program executing, comprising:

reading p, a period in number of user instructions;

computing, before the first period of execution of the program, $A_0$, the initial average duration of one instruction using a sample of user instruction executed read from the user instruction count (uic) of the operational computer;

reading $R_0$, the system clock value at starting of the execution of the program;

computing the virtual clock value V(x) corresponding to a given number of user instructions x already executed in the program inside the first period ($0 \leq x < p$), $$V_0(x) = A_0 * x + R_0,$$

x being read from the uic of the operational computer;

at the end of each nth period (counting from the first period where n=1), computing the virtual clock value $V_{n-1}(np)$, reading the system clock value ($R_n$) and computing a new value of the average duration of an instruction, $A_n$, as a function of $R_n$, $R_{n-1}$ and $V_{n-1}(np)$ so that at the end of the nth period, the difference between the virtual clock value and the system clock value is minimal;

for a x value of the uic corresponding to any given number of user instructions x already executed in the program inside a nth period (starting from the first period where n=1) $n*p \leq x \leq (n+1)*p$, computing the virtual clock value $V_n(x) = A_n * (x - n*p) + V_{n-1}(np)$.

This object is also reached with the method for providing a virtual clock on an operational computer, further comprising:

executing the program on a replication computer;

making the uic of the replication computer synchronized with the uic of the operational computer;

making the storing means content accessible from the replication computer;

reading $A_0$, $R_0 = B_0$ and p from the storing means;

computing the virtual clock value $V_0(x)$ corresponding to any given number of user instructions x already executed in the program inside the first period ($0 \leq x < p$) $V(x) = A_0 * x + B_0$;

for a x value of the uic corresponding to any given number of user instructions x already executed in the program inside a nth period (starting from the first period where n=1) $n*p \leq x < (n+1)*p$), reading $A_n$ and $B_n$ from the storing means and computing the virtual clock value for any uic value (x) read on the operational computer inside the n period $V_n(x) = A_n * (x - n*p) + B_n$.

The object is also reached with the methods as claimed in claims 2 to 8 and claims 10 to 17 for providing a virtual clock on an operational computer.

The object is also reached with the system of claim 18.

With the method of the present invention, the system clock accesses performed by the programs executing in an operational machine can be replicated on a replication immediately without transferring system clock value at each system clock access request. To make the system clock access a deterministic event, a computed clock is provided to the system clock access requester instead of the system clock. As the time is computed from the uic which is maintained between the operational and the replication machines, clock accesses can be reexecuted as a deterministic event according to the solution of the cited prior art patent application. As the virtual clock provided to the executing program depends on the state of the executing program and the operating system in the operational machine, it can be retrieved by re-executing the application in the replication machine. The non deterministic events of system clock accesses have become deterministic events, this makes the replication process much more efficient.

Replacing the system clock by a virtual clock has been already proposed, also in the domain of virtualization, but for a different purpose. It has been suggested by one developer of QEMU which is virtualization program based on operating system emulation, in the Web page: http://lists.gnu.org/archive/html/qemu-devel/2006-04/msg00459.html to provide a virtual clock, instead of the system clock, to operating systems emulated on an operational machine. The problem was to minimize the difference between the system clock of the operating system (host) and the system clock of the emulated operating system (guest). It is suggested to use a virtual clock computed using the number of instructions actually executed by the emulated operating system.

However, if this virtual clock can satisfy some needs for synchronization between processes, it cannot be used for replication of applications in fault tolerance systems. As a matter of fact, a virtual clock based on the number of instructions executed by a process is a linear function of the number of instructions which diverges quickly from the system clock. This prevents from using this QEMU developer clock for replicating the virtualized program by reexecution of program code on a replication machine in a fault tolerant system.

The virtual clock of the present invention is exactly synchronized on the system clock and because the errors of rounding are suppressed, it is thus reliable and thus can be used for fault tolerant system configurations.

With the method of the present invention, there is no need to record and transfer system clock information between the operational and a replication machine at each system clock access request. Thus, this solution limits the processing time in the operational machine for recording (store system clock and transfer to the standby machine) and it consequently limits the latency time of the application which is virtualized in the operational machine. It further limits the communications cost for transferring system clock access event information between the operational and the replication machine. The efficiency of the method allows also use for on the fly replication in fault tolerant system configurations.

As explained later in the document, compared to the existing software virtual clocks for synchronizing the clocks of distributed systems, the virtual clock used by the invention to make the system clock accesses deterministic, is exactly synchronized on the system clock. This is why this clock can be used in the fault tolerant environment which requires the use of a clock exactly synchronized with the system clock of the machines on which the record and the replay are executed.

The deterministic virtual clock can be advantageously used also each time there is a need for clock synchronization between distributed systems. In the domain of virtualization, this virtual clock can be used when virtualization is based on replication of applications or replication of virtual machines or hosted operating systems.

As this method may be software implemented, there is no hardware limitations like the ones that are imposed today by the current hardware fault tolerant systems.

The solution of the invention which has its main benefit with fault tolerant systems having an active-active architecture can be also used with replay later systems having active-passive architectures. In this case, the replication is not immediate. The same comment is valid also when the replication is performed for debugging or legal archiving purpose.

DETAILED DESCRIPTION OF THE PREFERRED EMBODIMENT

Figure 1:
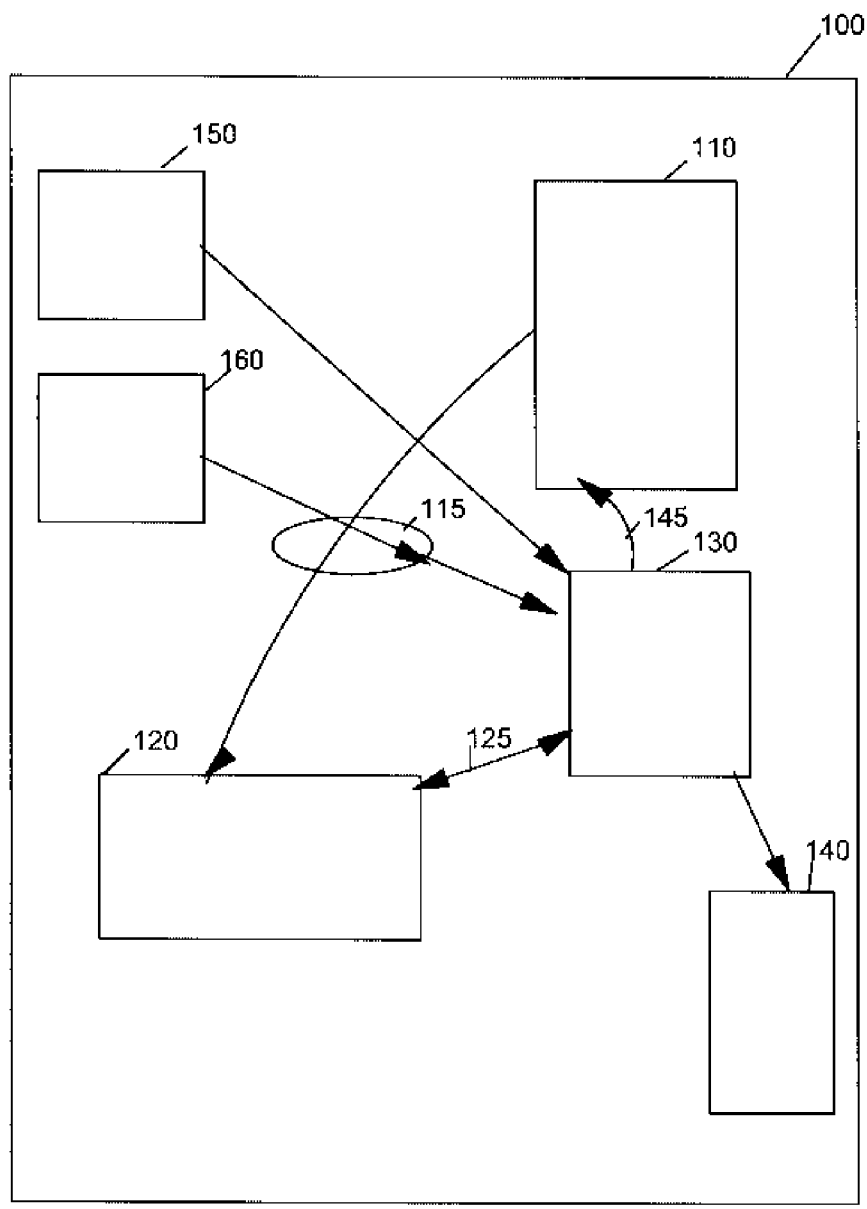
FIG. 1 illustrates the logical blocks implementing a use of the virtual clock of the preferred embodiment for virtualization of an application in an operational machine.

FIG. 1 illustrates the logical blocks implementing a use of the virtual clock of the preferred embodiment for virtualization of an application in an operational machine. The application which is recorded in the operational machine will be replayed in a replication machine. The processing of system clock accesses is implemented as a new program (130) of the recording program executed on the operational machine. One program (110) of the virtualized application or one module of the operating system executing on behalf of an application program, calls the system clock which is the system processor clock. The system clock may be accessed during execution of a 'read date' instruction in the executing program. The system clock request, which may be a system call, is intercepted and re-directed (115) to the virtual clock program (130). In fact, the system call routines to access the system clock have been re-written in the kernel of the operating system of the operational machine.

It is noted that different types of system clock access requests can be performed by programs and intercepted as described in the preferred embodiment. One example described above is when a system call to the system clock is executed in the program. The second case is when a machine instruction for reading the system clock is executed. For virtualization purpose, this machine instruction is instrumented to execute an exception handler which computes and returns a virtual clock value. In the rest of the document a 'system clock access request' stands for any type of request as presented in here above.

The virtual clock program computes a virtual clock value and returns it to the requesting program (145). For virtual clock computation, the virtual clock program accesses (125) the system clock (120). Some information is logged, for instance, in a file (140) during the recording on the operational machine. This data (and only this data) will be transferred to the replication machine for replay of the system clock accesses. The replication machine will store the transferred data to replay the clock accesses, starting from the checkpointed status of the virtualized application and re-executing the code using the transferred data (140).

Two logical blocks of the virtualization environment (150, 160) of the preferred embodiment are also illustrated in FIG. 1. In the preferred embodiment an entire application is virtualized in the operational machine. A virtualization container program (160) allows execution of specific virtualization code, record and replay of the virtualized application, respectively in the operational and replication machines. The virtualization container (160) comprises programs for isolating the applications by instrumentation of existing code on the operational machine and allows recording of virtualized application programs. In the virtualization container some programs are executed in the kernel of the operating system and some programs are executed in the user space. The virtual clock program (130) which is part of the virtualization container (160) provides the clock to the application (110). A performance monitoring counter (150), which is a service of the operating system, allows counting the number of instructions executed per active process (the user instruction count so called uic) and is able to create interrupts each time the executing program or application has executed a certain number of instructions.

Figure 2:
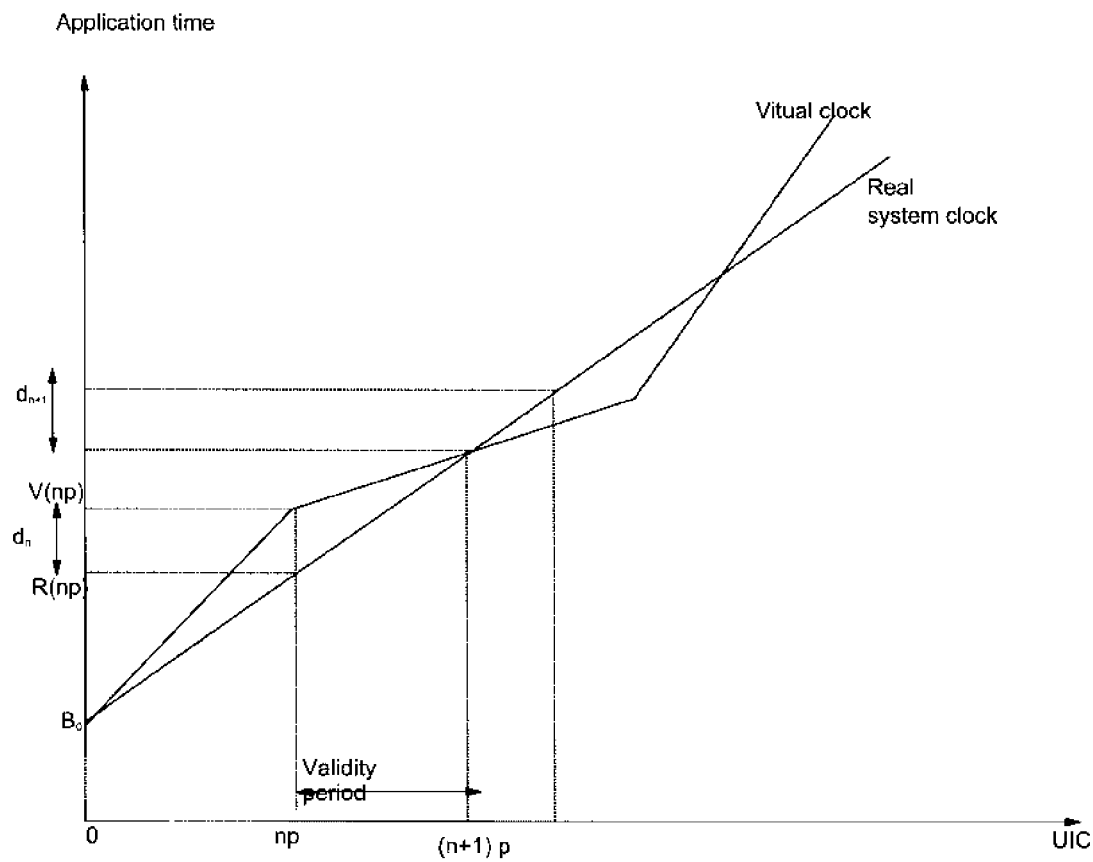
FIG. 2 shows curves of the real system clock and virtual clock obtained with periodical readjustment of the virtual clock to the real system clock values.

FIG. 2 shows the curves of the real system clock and virtual clock values (time in microseconds if it is the unit for the system clock) function of the user instruction count, uic, in number of instructions. The system clock is represented by a linear function of the number of uic which is the best approximation. The curve representing the virtual clock is close to the curve of the system clock. The virtual clock is periodically readjusted (at each period of p user instructions) to the real system clock values. Each virtual clock readjustment is represented by an intersection of the two curves. This readjustment insures a reliability of the computed virtual clock. In the preferred embodiment the readjustment is performed at the end of each period but any function readjusting the virtual clock to the system clock value in each period can be possibly used. Instead of being incremented by the processor cycle count as the system clock, the virtual clock is incremented by counting machine instructions executed by the application when executing in user mode (uic). Assuming that the uic is maintained synchronized between the operational machine and the replication machine, in the replication machine, the replay program will count exactly the same uic as the operational machine to reach the same execution point in the user space. Therefore, the virtual clock based on the uic will return in the replication machine value identical to the value in the operational machine when called at the same execution point in the replication machine. For replicating the application virtualized on the operational machine, there is no need to transfer data at each system clock access request between the operational and the replication machines. There is no performance penalty other than local virtualization that can be extremely slight.

The computation of the reliable virtual clock is as follows: applying the concept of virtual clock computation based on uic, one can obtain a theoretical value of the virtual clock with the following formula:

$$V = A*x + B \quad (1)$$

where A is the average duration of a user instruction in seconds, x is the number of instructions measured at the time of per second and B is the time provided by the real clock when x is set to 0, that is at starting of virtualization of the application when the virtualization container is created. Formula (1) being a monotonic increasing function, it satisfies the criteria for a clock. In order to avoid overflow problems, it is sufficient to periodically reset x and read a new value of B.

One imposes a validity limit to the initial parameter A for a period p expressed in number of user instructions. At the end of the period, a new A, the deviation against the real system clock is measured and a new value A is computed to compensate the virtual clock deviation in the next period. For the $n^{th}$ period of p user instructions, counting from 0, i.e. with any value of x satisfying $n*p \leq x < (n+1)*p$, we have the formula:

$$V_n(x) = A_n*(x-(n*p)) + B_n \quad (3)$$

At the beginning of the $n^{th}$ period, x is equal to $n*p$ and $$B_n = p*A_{n-1} + B_{n-1} \quad (6)$$

and therefore $$B_n = p*(A_0 + \ldots + A_{n-2} + A_{n-1}) + B_0 \quad (7)$$

$$B_n = p*\sum_{i=0}^{n-1} A_i + B_0$$

Where $B_0$ is the time provided by the real clock at the beginning of the first period (when n is equal to 0). The virtual clock depends only on $B_0$ and the successive values of A:

$$V_n(x) = A_n*(x-(n*p)) + (A_0 + \ldots + A_{n-2} + A_{n-1})*p + B_0 \quad (8)$$

$$V_n(x) = A_n*(x-n*p) + p*\sum_{i=0}^{n-1} A_i + B_0$$

This last formula could be used for computing the $V_n(x)$ values in the operational and replication computers but the computers rather use the (3) formula which is iterative and thus less costly to implement.

Figure 3:
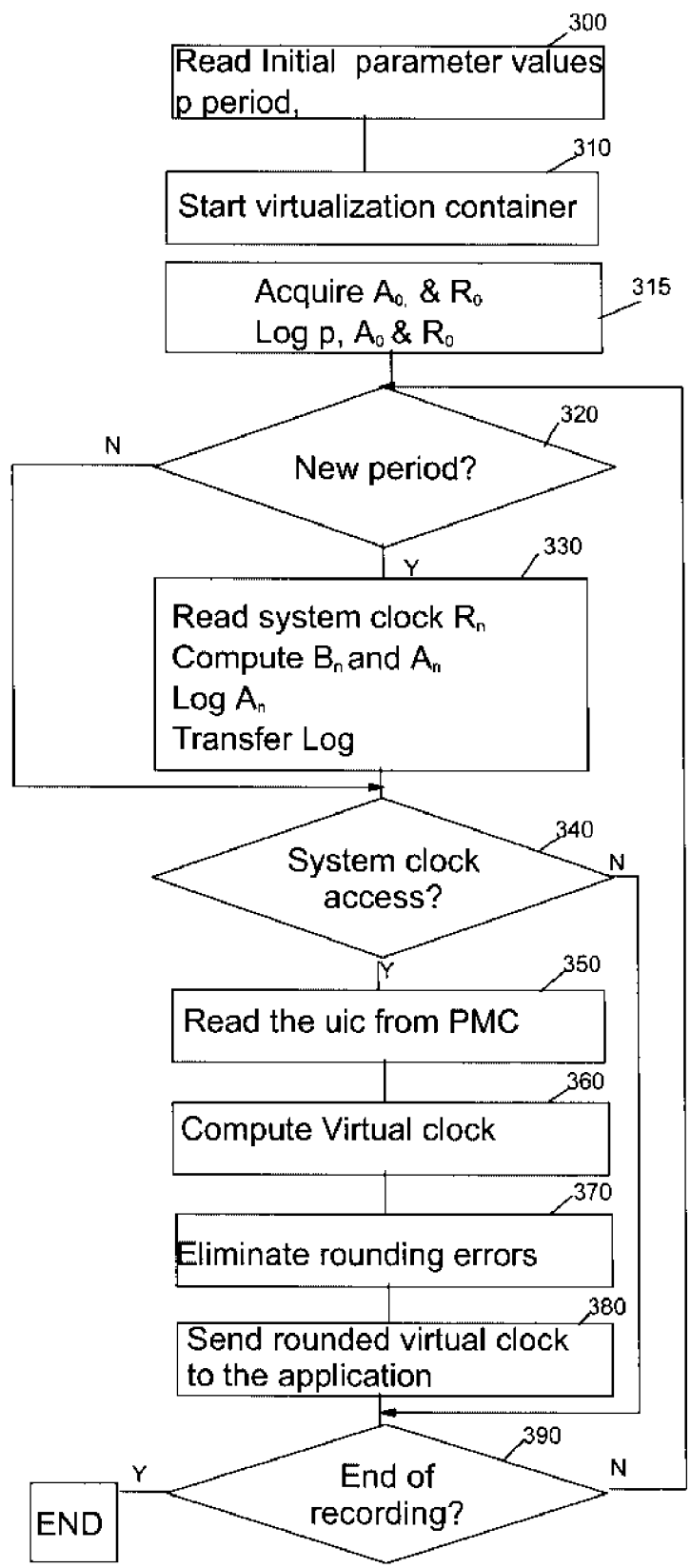
FIG. 3 shows the flowchart of computation of the virtual clock in the operational machine according to the preferred embodiment.

We want to keep the virtual clock deviation minimal and to have the virtual time values equally distributed around the real time. In FIG. 3, the abscissa is the number of user instructions and the ordinates are the virtual clock (V curve) and the real system clock (R curve) for the application. At each period, a new value of $A_n$ is recomputed to compensate a possible deviation of the virtual clock against the real clock. The deviation $d_n$ for the period n is given by:

$$d_n = |B_n - R_n| \quad (9)$$

where $B_n$ is the virtual clock value and $R_n$ is the real clock value measured at the end of the nth period ($(n-1)*p \leq x < n*p$)

$$B_n = V_{n-1}(np)$$

The real clock value can be expressed in a similar way to the virtual clock value in (6):

$$R_n = p*ALPHA_{n-1} + R_{n-1} \quad (10)$$

Where $ALPHA_{n-1}$ is the real clock rate during the nth period. We compute $A_n$ such as the deviation $d_{n+1}$ becomes null at the end of the nth period:

$$d_{n+1} = |B_{n+1} - R_{n+1}| = 0 \quad (11)$$

Which is equivalent to:

$$B_{n+1} = R_{n+1} \quad (12)$$

We use (6) and (10) to transform this into:

$$p*A_n + B_n = p*ALPHA_n + R_n \quad (13)$$

Which is equivalent to:

$$A_n = ALPHA_n + (R_n - B_n)/p \quad (14)$$

We extrapolate the new real clock rate, assuming that $ALPHA_n$ is equal to $ALPHA_{n-1}$, to calculate the new virtual clock rate:

$$A_n = ALPHA_{n-1} + (R_n - B_n)/p \quad (15)$$

We can see that the new virtual clock rate $A_n$ is of the same order of magnitude than the previous real clock rate $ALPHA_{n-1}$ with a compensation factor proportional to the previous deviation.

For n>0 the real clock rate $ALPHA_{n-1}$ can be replaced with its value, from (10):

$$A_n = (R_n - R_{n-1})/p + (R_n - B_n)/p$$

$$A_n = (2R_n - R_{n-1} - V_{n-1}(np))/p \quad (16)$$

Using (7):

$$A_n = (2R_n - R_{n-1})/p - \sum_{i=0}^{n-1} A_i + B_0$$

This last formula is not used for computing the $A_n$ values in the operational computer because the computer rather uses the (16) formula which is iterative and thus less costly to implement.

Consequently, the computation of virtual clock performed by the virtual clock program (130) is initialized with a value of p, in number of user instructions which is the period of computing virtual clock deviation compensation. Then, during a sampling period a value of B which is the real system clock value is read when the virtualization container is started and an initial value of A which is the an average of the UIC (User Instruction Count) values given by the Performance Monitor Unit during the execution of the first user instructions executed during the first period of execution of the application.

At each new period $p_n$, the real system clock $R_n$ is read and a new value of the average duration of a user instruction $ALPHA_{n-1}$ is computed according to formula (10) and the new value of virtual clock rate $A_n$ is computed according to formula (16).

At each system clock access intercepted by the virtualization program, the uic is read (x) and the virtual clock is computed using the formula (8).

This value to be final is rounded as described later in the document in reference to FIG. 4. The result is sent to the application (145).

FIG. 3 shows the flowchart of the virtual clock program (130) computation of the virtual clock in the operational machine according to the preferred embodiment. The initial parameter and p, the period in number of uic is read (300). It is noted that the p period provided to the program can be adapted and tuned using a feedback loop process evaluating the quality of the virtual clock which is computed compared to the real system clock. The virtualization container program (150) is started (310) for virtualizing an application of which the code is executing on the operational machine. An initial value $A_0$ of the average instruction time can is calculated reading the real clock values on the operational machine on a sample program and dividing by P the difference between these two system clock values. This computation of the initial instruction time is performed before the system clock ($R_0$) is read for the first time. At each period np (answer Yes to test 320), the system clock $R_n$ is read, the $V_{n-1}(np)=B_n$ value is computed ($V_{n-1}$ is the virtual clock in the preceding period) and the average $A_n$ is computed (equation (16)) for the next period; $A_n$ is logged and transferred to the replication machine (330). At each system clock access request (answer Yes to test 340), the uic is read (350) from the PMC and the virtual clock $V_n$ (uic) is computed (360) using $A_n$, $B_n$ and formula (8). The rounding errors of the uic are eliminated (370). This step is described later in the document in relation with FIG. 4. The computed virtual clock is then sent to the system clock requester in the place of the system clock. If the recording of the application is ended, this program is stopped. If not, the next clock access will be processed in the same way.

One other embodiment consist in logging at each period not only $A_n$ but also the computed $B_n=V_{1-1}(np)$ value. In this case step, 330 consists in 'Log $A_n$ and $B_n$, transfer Log'. In this second embodiment, $A_n$ and $B_n$ values will be transferred to the replication machine and, in the replication machine, the two values $A_n$ and $B_n$ will be read from the log (FIG. 6, 630 later in the document) and $B_n$ will be not computed: this simplifies the replication program but increases the transfer.

Figure 4:
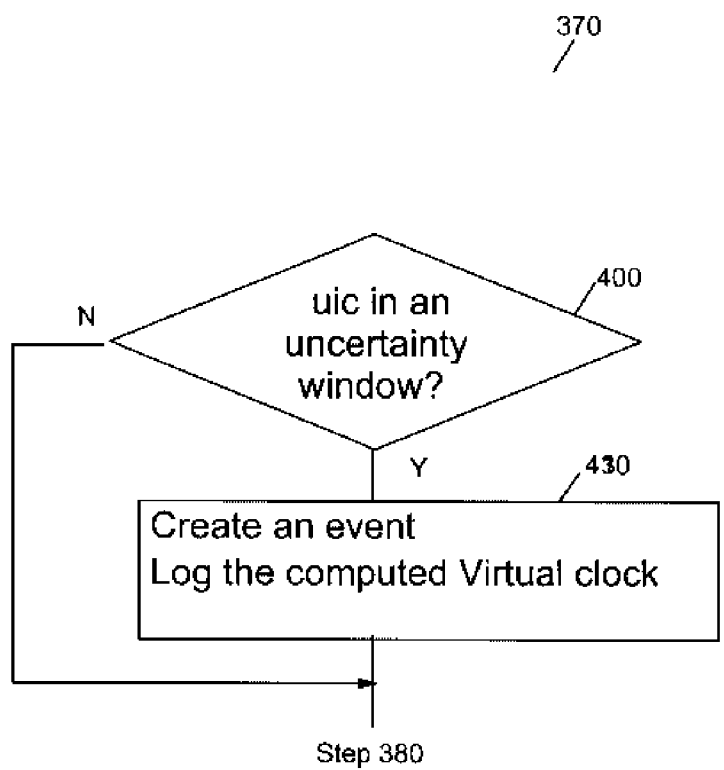
FIG. 4 is the flowchart of the elimination of the rounding error while computing the virtual clock as performed in one step of the flowchart of FIG. 3.

FIG. 4 is the flowchart of the elimination of the rounding error when computing the virtual clock on the operational machine according to the preferred embodiment. This figure gives details on the step (370) of eliminating the rounding error in the general flowchart of FIG. 3 describing the application record in the operational machine. Rounding to the user instruction count (uic) used for virtual clock calculation is necessary because the Performance Monitoring Counters (PMC) of the Performance monitoring unit return instruction count in nano-seconds and the virtual clock returns to the application values in micro-seconds. It is thus necessary to round the uic from the PMC to the nearest microsecond for computing the virtual clock values. This rounding is included in the computing step of the virtual clock. However, the resulting virtual clock would not be reliable enough as required when used in a replication process for fault tolerant systems. As a matter of fact, for fault tolerant systems restarting application on the fly on a replication machine, the result must be identical to the status on the operational machine at the time of the failure. Now, the lack of precision inherent to the PMC leads to situations where virtual clocks on the operational and replication machines diverge and return values differing by 1 microsecond. For example, assuming that one user instruction count is one nanosecond, if the PMC of the operational machine returns 1499 uic and the PMC of the replication machine returns 1500 uic, the difference of one uic becomes a difference of 1 μsec after rounding:

round(1.499)=1 in the operational machine and,
round(1.500)=2 in the replication machine.

This error of 1 unit of virtual time is not acceptable for deterministic replay. For this reason, if e is the absolute value of the maximal error of the PMC when a uic value x is in an uncertainty window such that $$n+0.5-2e \leq x \leq n+0.5+2e$$

n being any integer,
(answer yes to test 400),
in this case, the rounding of the uic is performed in the operational machine only, and the virtual clock value is logged and transferred to the replication machine thus creating a non deterministic event. This event will be replayed in the replication machine without recomputing the virtual time from the uic, when the uic value y on the replication machine belongs to the interval $$n+0.5-e \leq y \leq n+0.5+e$$

where n is an integer.
When y does not belong to the interval, the virtual time is calculated from the uic value y. The uncertainty window on the operational machine is the double of the uncertainty window on the replication machine, in order to guarantee the availability of the pre-calculated virtual time in case it is needed by secondary.

If we estimate the average duration of a user instruction to be 1 nanosecond, and the error of PMC to be e=250 instructions, then the uncertainty window on the operational machine will be 1 microsecond (half of it on the replication machine). The virtual clock unit being 1 microsecond, the probability of hitting the rounding uncertainty interval is $10^{-3}$ (1 per thousand). The overhead of having to transmit the virtual time from the operational machine to the secondary machine is therefore bounded by this very low probability.

Figure 5:
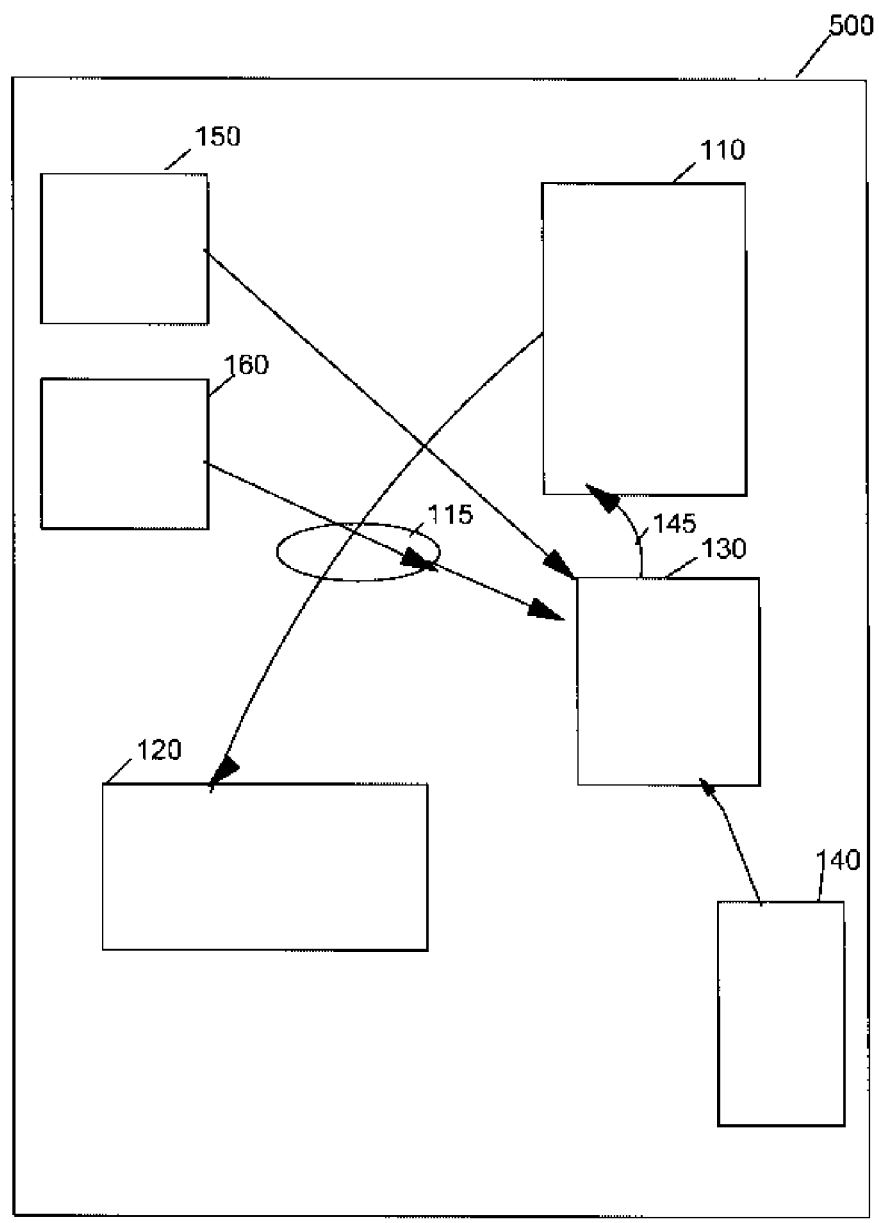
FIG. 5 illustrates the logical blocks implementing a use of the virtual clock of the preferred embodiment for replicating a virtualized application in a replication machine.

FIG. 5 illustrates the logical blocks implementing a use of the virtual clock of the preferred embodiment for replicating a virtualized application in a replication machine. This flowchart is for the symmetrical process as described sooner in the document in relation with FIG. 1. In the replication machine the same virtualization environment (150, 160) is installed. With the assumption that the uic are synchronized in the operational and replication machines, and with the use of a computed virtual clock, the replication of the application virtualized in the operational machine is done by reexecuting the application code (110). A request to access the system clock (120) may be performed by the application code in execution and is intercepted (115) by the virtual clock program (130). As in the operational machine, a system clock access request may be originated directly by the application code via a system call or may be originated by other programs, the service call being illustrated in FIG. 5. The virtual clock value is computed by the virtual clock program by reading the logged values (140) which were transferred from the operational machine to the replication machine. The read values are the average instruction rate for the period as well as the system clock for virtual clock readjustment and the rounding value of the uic if necessary. Then, the computed virtual clock is sent back (145) to the requester (the application code 110 in FIG. 5) by the virtual clock program (130).

It is noted that reexecution of code in the replication machine starts at each occurrence of a non deterministic event. In the operational machine the application code is executed until a non deterministic event occurs. When a non deterministic event occurs, the event information are sent to the replication machine which reexecutes the code of the application until the occurrence of the non deterministic event which is entirely replayed by checkpointing the application with the event data received from the operational machine. The process of virtual clock computation as illustrated in FIG. 5 is performed between two occurrences of non deterministic events which cannot be replayed by application code reexecution of the replication machine.

Figure 6:
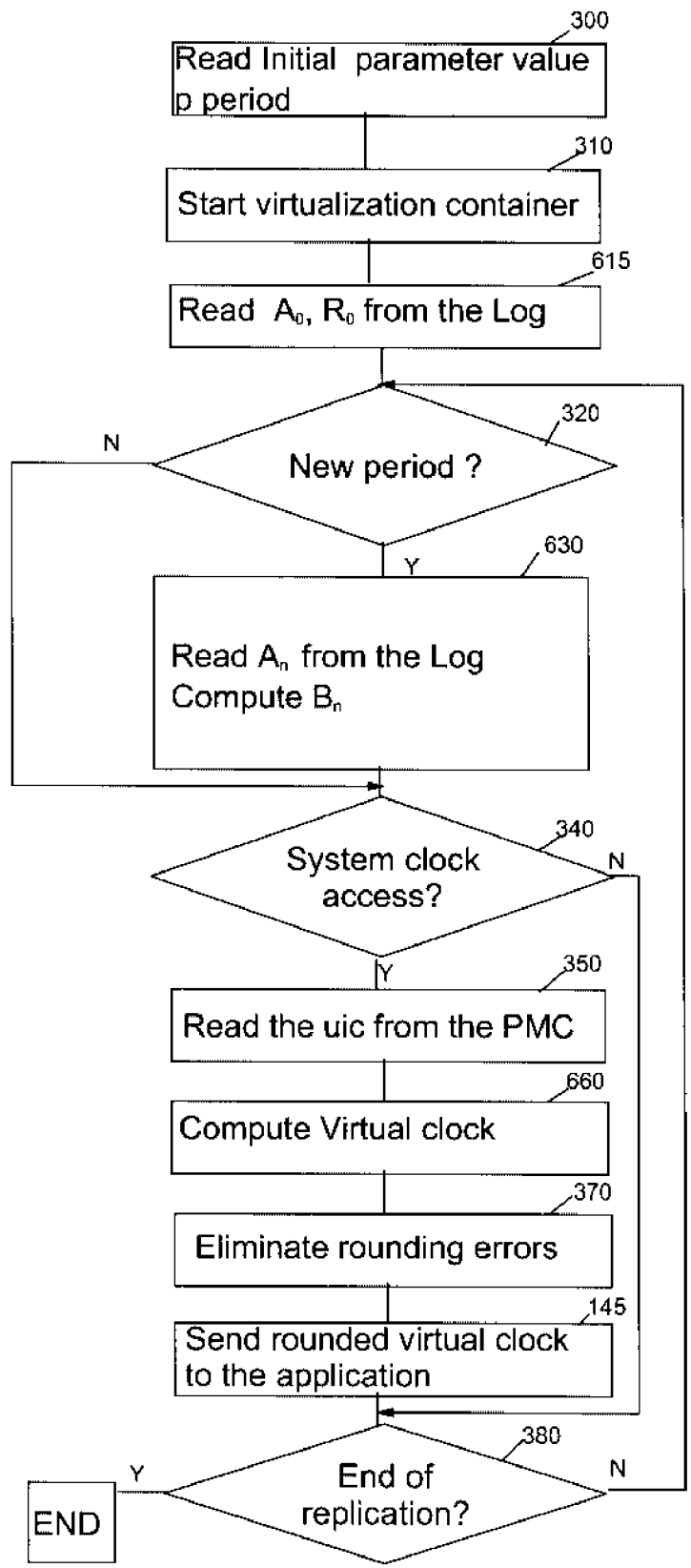
FIG. 6 shows the flowchart of computation of the virtual clock in the replication machine according to the preferred embodiment.

FIG. 6 shows the flowchart of computation of the virtual clock in the replication machine according to the preferred embodiment. The initial par meter value for the period in number of instructions is read by the program (200). The virtualization container is started (210) in the replication machine. The initial average instruction rate is read by the Log which has been transferred from the operational to the replication machine (615). At each new period np (answer Yes to test 220), the average instruction rate for the next period $A_n$ is read (630) and the $B_n=V_{n-1}(np)$ value is computed ($V_{n-1}$ is the virtual clock in the preceding period). Between two period ends, if a system clock access request is received (answer Yes to test 340), the uic is read (350) from the PMC of the replication machine and the virtual clock $V_n$ (uic) is computed (660) using $A_n$, $B_n$ and formula (8). The rounding error is suppressed (370) as described later in the document in relation with FIG. 7. The virtual clock is then sent to the application (380). The process stops (answer Yes to test 380) if the replication program must stop, for instance, at the occurrence of a non deterministic event.

It is noted that according to the second embodiment of the virtual clock computation program (130) in the operational machine, if the $B_n$ value is read from the Log in step 630, there is no need to recompute $V_{n-1}(np)$. In this case, step 630 is only read $A_n$ and $B_n$ from Log.

Figure 7:
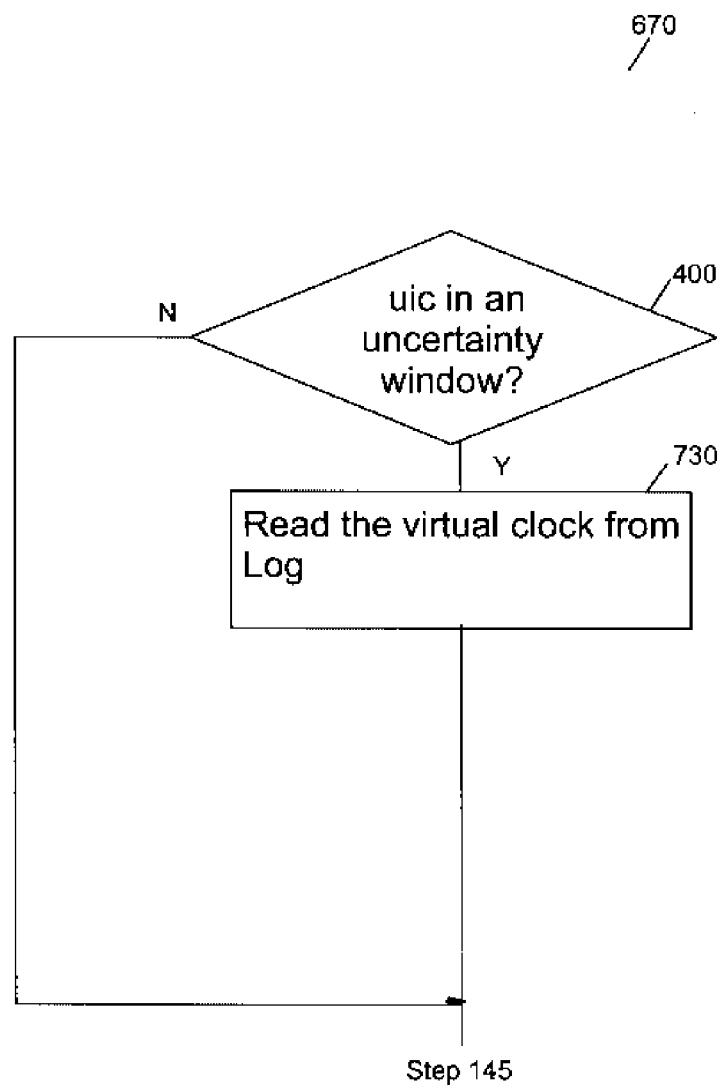
FIG. 7 is the flowchart of the elimination of the rounding error in the replication machine as performed in one step of the flowchart of FIG. 6.

FIG. 7 is the flowchart of the elimination of the rounding error performed in the replication machine when replicating the virtual clock computation. If the uic representing the number of instructions already executed when a system clock access is requested is in an uncertainty window such that $$n+0.5-e \leq x \leq n+0.5+e$$

n being any integer,
(answer yes to test 400), the virtual clock is not computed but read from the Log (730). This value is sent to the application code (step 145 in the flowchart of FIG. 6).

The invention claimed is:

1. A method for providing a virtual clock on an operational computer having one program executing, comprising:
    reading p, a period in number of user instructions;
    computing, before a first period of execution of the program, $A_0$, an initial average duration of one instruction using a sample of user instruction executed read from a user instruction count (uic) of the operational computer;
    reading $R_0$, the system clock value at starting of the execution of the program;
    computing a virtual clock value $V(x)$ corresponding to a given number of user instructions x already executed in the program inside the first period ($0 \leq x < p$), $V_0(x) = A_0*x+R_0$, x being read from the uic of the operational computer;
    at the end of each nth period (counting from the first period where n=1), computing the virtual clock value $V_{n-1}$ (np), reading the system clock value ($R_n$) and computing a new value of the average duration of an instruction, $A_n$, as a function of $R_n$, $R_{n-1}$ and $V_{n-1}$ (np) so that at the end of the nth period, the difference between the virtual clock value and the system clock value is minimal;
    for a x value of the uic corresponding to any given number of user instructions x already executed in the program inside a nth period (starting from the first period where n=1) $n*p \leq x \leq (n+1)*p$), computing the virtual clock value $V_n(x)=A_n*(x-n*p)+V_{n-1}(np)$.

2. The method of claim 1 wherein the computing a new value of the average duration of an instruction, $A_n$, uses the function:

$$A_n=(2R_n-R_{n-1}-V_{n-1}(np))/p.$$

3. The method of claim 1 further comprising included in the step of computing the virtual clock $V_n(x)$:
    rounding x to a time unit of the system clock.

4. The method of claim 1 further comprising:
    logging in a storing means $A_0$, $B_0=R_0$ and p after the respective computing and reading steps and logging $A_n$ and $B_n=V_{n-1}$ (np) in the storing means after the step of computing $A_n$.

5. The method of claim 1 further comprising:
    logging in a storing means $A_0$, $B_0=R_0$ and p after the respective computing and reading steps and logging $A_n$ in the storing means after the step of computing $A_n$.

6. The method of claim 4, further comprising, if x is in an uncertainty window of values, logging, (n being any integer), $V_n(x)$ in the storing means.

7. The method of claim 6 wherein the uncertainty window of values for x, e being a absolute value of a maximal error for reading the uic on the operational machine, is: $n+0.5-2e \leq x \leq n+0.5+2e$ n being any integer.

8. The method of claim 1 further comprising:
    intercepting a system clock access request generated by the execution of the program;
    reading the uic value on the operational computer corresponding to a given number of user instructions x already executed in the program;
    providing, instead of the system clock, the virtual clock $V_n(x)$ to the system clock access requester.

9. The method of claim 4 further comprising:
    executing the program on a replication computer;
    making the uic of the replication computer synchronized with the uic of the operational computer;
    making the storing means content accessible from the replication computer;
    reading $A_0$, $R_0=B_0$ and p from the storing means;
    computing the virtual clock value $V_0(x)$ corresponding to any given number of user instructions x already executed in the program inside the first period ($0 \leq x \leq p$) $V(x)=A_0*x+B_0$;
    for a x value of the uic corresponding to any given number of user instructions x already executed in the program inside a nth period (starting from the first period where n=1)$n*p \leq x<(n+1)*p$), reading $A_n$ and $B_n$ from the storing means and computing the virtual clock value for any uic value (x) read on the operational computer inside the nth period $V_n(x)=A_n*(x-n*p)+B_n$.

10. The method of claim 9 wherein the step of making the storing means accessible from the replication computer comprises transferring from the operational computer the storing means content to the replication computer after the step of logging in a storing means $A_0$, $B_0=R_0$ and p after the respective computing and reading steps and logging $A_n$ and $B_n=V_{n-1}(np)$ in the storing means.

11. The method of 9 wherein in the step of computing the virtual clock value, the step of reading $B_n$ is replaced by computing the virtual clock value $V_{n-1}(np)=B_n$.

12. The method of claim 11 wherein the step of making the storing means accessible from the replication computer comprises transferring from the operational computer the storing means content to the replication computer after the step of logging in a storing means $A_0$, $B_0=R_0$ and p after the respective computing and reading steps and logging $A_n$ in the storing means.

13. The method of claim 10 wherein the step of making the storing means accessible from the replication computer comprises transferring from the operational computer the storing means content to the replication computer after the step of logging, (n being any integer), $V_n(x)$ in the storing means.

14. The method of claim 9 further comprising, included in the step of computing the virtual clock:
Rounding x to a time unit of the system clock.

15. The method of claim 9 wherein, if x is in an uncertainty window of values, replacing the computed $V_n(x)$ by the $V_n(x)$ value read from the storing means.

16. The method of claim 15 wherein the uncertainty window of values for x, e being the absolute value of the maximal error for reading the uic on the operational machine, is:

$$n+0.5-e \leq x \leq n+0.5+e$$

n being any integer.

17. The method of claim 9 further comprising:
intercepting a system clock request generated by the execution of the program on the replication computer;
reading the uic value on the operational computer corresponding to a given number of user instructions x already executed in the program;
providing, instead of the system clock, the virtual clock V(x) to the system clock access requester.

18. A system comprising means adapted for carrying out the method according to claim 1.

* * * * *